United States Patent [19]

Wada et al.

[11] 4,368,596
[45] Jan. 18, 1983

[54] FEED SAFETY APPARATUS FOR MOVABLE MEMBER

[75] Inventors: Ryuji Wada, Nagoya; Kenichi Munekata; Kunihiko Unno, both of Kariya; Norihiko Shimizu, Nagoya; Yasuo Suzuki, Kariya, all of Japan

[73] Assignee: Toyoda Koki Kabushiki Kaisha, Kariya, Japan

[21] Appl. No.: 237,271

[22] Filed: Feb. 23, 1981

[30] Foreign Application Priority Data

Feb. 29, 1980 [JP] Japan .................................. 55-24132

[51] Int. Cl.³ .............................................. B24B 49/08
[52] U.S. Cl. .................. 51/165.77; 51/165.8; 51/165.9
[58] Field of Search ............. 51/165.77, 165.8, 165.91, 51/165.92, 165.93, 165.87, 34 D, 34 J, 165.71, 165.9

[56] References Cited

U.S. PATENT DOCUMENTS

| 2,254,784 | 9/1941 | Silven ................................ 51/165.92 |
| 2,561,004 | 7/1951 | Wilson ............................... 51/165.92 |
| 3,124,910 | 3/1964 | Deser ................................. 51/165.92 |
| 3,827,190 | 8/1974 | Moriguchi ......................... 51/165.92 |
| 4,115,958 | 9/1978 | Englander .......................... 51/165.71 |

*Primary Examiner*—Harold D. Whitehead
*Attorney, Agent, or Firm*—Oblon, Fisher, Spivak, McClelland & Maier

[57] ABSTRACT

A feed safety apparatus for a movable member slidably supported on a stationary bed of a machine tool. A feed device moves the movable member at various speeds. A hydraulic cylinder is fixedly mounted on the movable member and includes a piston slidably received therein. A reference plate member is secured to the bed and operatively connected to the piston for permitting bodily movement of the hydraulic cylinder and the piston within a predetermined distance, but restraining movement of the piston beyond the predetermined distance to cause relative movement between the hydraulic cylinder and the piston. A fluid flow regulating device is disposed between the pair of cylinder chambers of the hydraulic cylinder for restrictively controlling relative movement between the hydraulic cylinder and the piston.

6 Claims, 10 Drawing Figures

FEED SAFETY APPARATUS FOR MOVABLE MEMBER

BACKGROUND OF THE INVENTION

1. Field of the Invention

The present invention relates to a feed safety apparatus for a movable member slidably supported on a stationary bed of a machine tool, such as a grinding machine.

2. Description of the Prior Art

In a grinding machine as disclosed in U.S. Pat. No. 4,115,958, a carriage rotatably supporting a grinding wheel is moved by a single servomotor at a rapid non-grinding feed speed until a programmed fast feed end point is reached and then at a slow grinding feed speed until a workpiece is finished to a predetermined size. If rapid feed movement of the carriage is continued beyond the programmed fast feed end point due to malfunction of the circuit which controls rotation of the servomotor, the grinding wheel would be brought into engagement with the workpiece at the rapid feed speed, and this results in breakage of the grinding wheel, fault of the workpiece and the like.

In order to prevent the grinding wheel from engaging the workpiece at the rapid feed speed, measures have been taken in the grinding machine to shut down the same in response to a signal from a sensor in the event that the current required by a motor to rotate the grinding wheel exceeds a predetermined relatively low idle current during rapid feed movement. However, if the sensor itself malfunctions, the grinding wheel could be still brought into engagement with the workpiece at the rapid feed speed.

SUMMARY OF THE INVENTION

It is, therefore, an object of the present invention to provide an improved feed safety apparatus for a movable member capable of mechanically preventing the movable member from moving at an overspeed even if an electrical feed safety apparatus malfunctions.

Another object of the present invention is to provide an improved feed safety apparatus of the character set forth above, wherein a hydraulic cylinder mechanism is connected between the movable member and a stationary bed for mechanically preventing the movable member from moving at an overspeed.

Briefly, according to the present invention, these and other objects are achieved by providing a feed safety apparatus for a movable member slidably supported on a stationary bed of a machine tool, as mentioned below. Feed means moves the movable member at various speeds including a rapid feed speed. A hydraulic cylinder is fixedly mounted on one of the bed and the movable member and including a piston slidably received therein to define a pair of cylinder chambers. A reference plate member is secured to the other of the bed and the movable member and is operatively connected to the piston for permitting bodily movement of the hydraulic cylinder and the piston within a predetermined distance, but restraining movement of the piston beyond the predetermined distance to cause relative movement between the hydraulic cylinder and the piston. Fluid flow regulating means is disposed between the pair of cylinder chambers for restrictively controlling relative movement between the hydraulic cylinder and the piston.

BRIEF DESCRIPTION OF THE DRAWINGS

Various other objects, features and attendant advantages of the present invention will be readily appreciated as the same becomes better understood by reference to the following detailed description of preferred embodiments, when considered in connection with the accompanying drawings, in which.

DETAILED DESCRIPTION OF THE PREFERRED EMBODIMENTS

Figure 1:
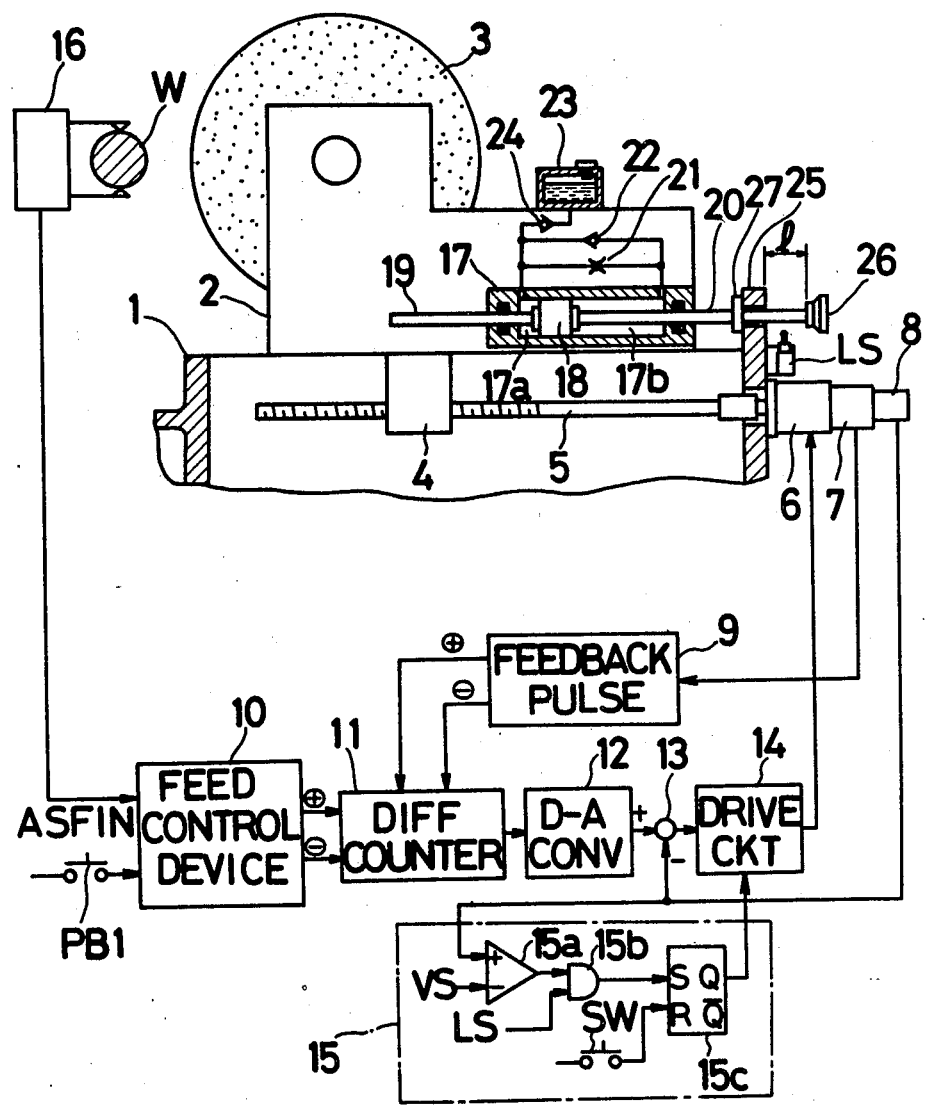
FIG. 1 is a schematic illustration of a first embodiment of a feed safety apparatus according to the present invention.

Referring now to the drawings, wherein like reference numerals or characters refer to identical or corresponding parts throughout the several views, and more particularly to FIG. 1, there is shown a machine bed 1 of a grinding machine on which a wheel support 2 is slidably mounted for moving a grinding wheel 3, rotatably carried thereby, toward and away from a workpiece W to be ground. A nut member 4 secured to the underside of the wheel support 2 is in threaded engagement with a feed screw shaft 5 rotatable by a d.c. servomotor 6, which is mounted on the rear surface of the bed 1. A resolver 7 is connected to the servomotor 6 to output a voltage with a phase proportional to the rotary angle of the feed screw shaft 5, and a velocity detector 8 is provided for detecting the actual feed rate of the wheel support 2. A feedback pulse generator 9 is connected to the resolver 7 to generate one feedback pulse each time the feed screw shaft 5 is rotated a predetermined angular distance.

A servomotor control device, constituted by a differential counter 11, a digital to analog converter 12, an operation circuit 13 and a drive circuit 14, serves to rotate the servomotor 6 for movement of the wheel support 2 in response to feed pulses distributed from a feed control device 10. The distributed pulses output from the feed control device 10 at a frequency corresponding to a commanded feed rate are supplied to the differential counter 11, by which calculation is carried out for the difference in number between the distributed pulses and the feedback pulses generated from the pulse generator 9. It is to be noted here that such calculated difference indicates a value proportional to the frequency of the distributed pulses, namely to the commanded feed rate.

The difference calculated by the differential counter 11 is converted by the digital to analog converter 12 into a corresponding analog signal, which is then applied as a velocity command voltage to the operation circuit 13. For velocity feedback control, this operation circuit 13 calculates the difference between the velocity command voltage received from the digital to analog converter 12 and a velocity feedback voltage received from the velocity detector 8, and supplies the differential voltage to the drive circuit 14. Since the drive circuit 14 is capable of controlling the rotational speed of the servomotor 6 to decrease the differential voltage output from the operation circuit 13 to zero, the servomotor 6 is rotated at a velocity corresponding to the velocity command voltage output from the digital to analog converter 12, whereby the wheel support 2 is normally displaced at a commanded feed rate.

A circuit 15, constituted by an analog comparator 15a, an AND gate 15b, a flip flop 15c and a switch SW, serves to prevent an abnormal overspeed of the wheel support 2. The comparator 15a compares the velocity feedback voltage received from the velocity detector 8 with a reference voltage VS, which is set to designate a slow feed rate of the wheel support 2 slower than a rapid feed rate. The comparator 15a is adapted to output an abnormal signal while the actual feed rate of the wheel support 2 exceeds the set feed rate designated by the reference voltage VS. The abnormal signal from the comparator 15a is applied to a set terminal S of the flip flop 15c through the AND gate 15b, which is responsive to an actuation signal of a limit switch LS confirming a rapid feed advanced end of the wheel support 2. The flip flop 15c is provided to memorize the occurrence of abnormality and is set if the actual feed rate of the wheel support 2 exceeds the set feed rate corresponding to the reference voltage VS when the limit switch LS is actuated upon reaching of the wheel support 2 to its rapid feed advanced end. The flip flop 15c, when set, outputs a set signal from its set output terminal Q to the drive circuit 14, which thus discontinues the rotation of the servomotor 6. The signal from the flip flop 15c is further used to inform an operator of the occurrence of abnormality. The switch SW is connected to a reset input terminal R of the flip flop 15c to reset the same.

A reference numeral 16 denotes a sizing device for measuring the outer diameter of the workpiece W being ground by the grinding wheel 3. The sizing device 16 is adapted to generate a sizing signal ASFIN when the workpiece W is ground to a predetermined finish size, and this sizing signal ASFIN is applied to the feed control device 10 to cause the wheel support 2 to be rapidly retracted. A reference character PB1 denotes a switch for starting the operation of the feed control device 10.

A cylinder member 17 is fixedly mounted on the rear of the wheel support 2 and receives a piston 18 therein to be slidable in a direction parallel to the movement of the wheel support 2. Piston rods 19 and 20 are connected to the opposite ends of the piston 18. Left and right cylinder chambers 17a and 17b defined by the piston 18 communicate with each other through a fluid flow regulating mechanism 21, such as a throttle, for setting a relative moving speed between the piston 18 and the cylinder member 17 into a predetermined value lower than the rapid feed speed of the wheel support 2. A check valve 22 is provided in parallel relationship with the throttle 21 for permitting fluid flow from the left cylinder chamber 17a to the right cylinder chamber 17b, but preventing fluid flow from the right cylinder chamber 17b to the left cylinder chamber 17a. An auxiliary fluid reservoir 23 is mounted on the wheel support 2 and is communicated with the cylinder chamber 17a through a check valve 24. The piston rod 20 extends from the cylinder member 17 and passes through a reference plate member 25 secured to the rear end of the bed 1. The piston rod 20 is provided at its extended end with an abutting member 26 which is abuttable with the rear side of the reference plate member 25 to restrict forward movement of the piston 18. A distance l between the reference plate member 25 and the abutting member 26 with the wheel support 2 being in its retracted end position is set to be larger a predetermined amount than the rapid feed amount of the wheel support 2. The limit switch LS is secured to the reference plate member 25 in such a manner as to be actuated by the abutting member 26 when the wheel support 2 is advanced to its rapid feed advanced end. The piston rod 20 is further provided at its intermediate portion with a flanged portion 27 which is engageable with the front side of the reference plate member 25 to restrict rearward movement of the piston 18, so as to maintain the distance l between the abutting member 26 and the reference plate member 25. With this arrangement, the piston 18 is moved with the cylinder member 17 unless restricted from its movement.

In operation, when the start switch PB1 is depressed, the feed control device 10 outputs to the differential counter 11 command pulses at a frequency corresponding to the rapid feed rate, whereby the differential counter 11, the digital to analog converter 12, the operating circuit 13 and the drive circuit 14 are operated to drive the servomotor 6 for rotation of the feed screw shaft 5. Accordingly, the wheel support 2 is advanced a predetermined amount at the rapid feed rate to its rapid feed advanced end where the limit switch LS is actuated by the abutting member 26. Thereafter, the feed control device 10 outputs commanded pulses at a frequency corresponding to a rough grinding feed rate, so that the wheel support 2 is advanced a predetermined amount at the rough grinding feed rate to perform a rough grinding operation on the workpiece W. Upon completion of the rough grinding operation, the feed control device 10 outputs command pulses at a frequency corresponding to a fine grinding feed rate, so that the wheel support 2 is advanced at the fine grinding feed rate to perform a fine grinding operation. When the workpiece W is ground to a predetermined finish size during the fine grinding operation, the sizing device 16 outputs the sizing signal ASFIN to the feed control device 10. Upon receipt of the sizing signal ASFIN from the sizing device 16, the feed control device 10 causes the wheel support 2 to retract a predetermined amount corresponding to the distance l to its retracted end position at the rapid feed rate.

Figure 2:
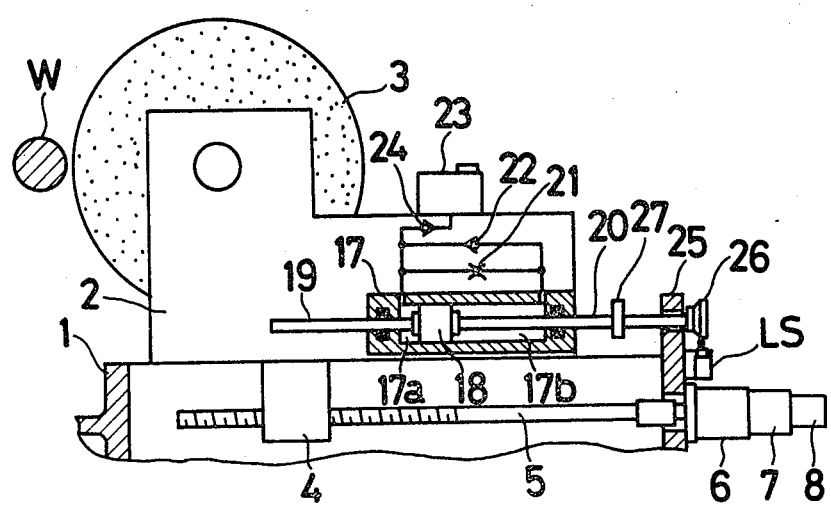
FIGS. 2 to 4 are views similar to FIG. 1 but showing the parts in different relative positions.
Figure 3:
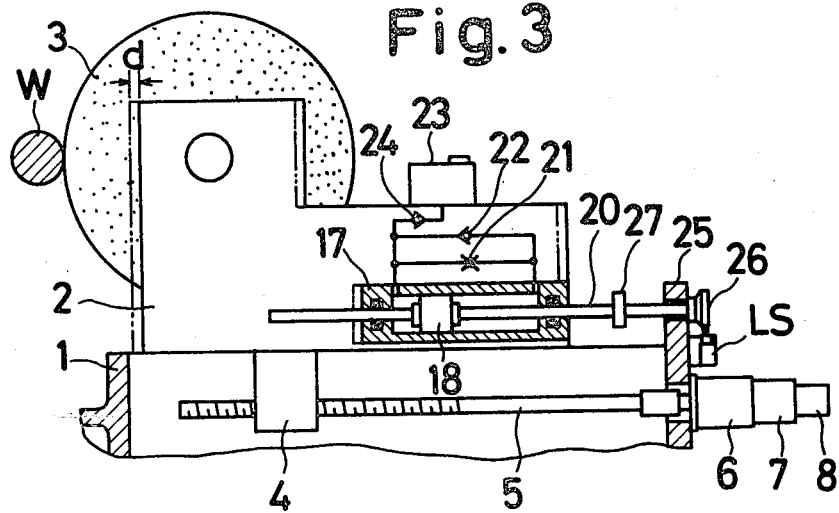

If the above-described grinding cycle is normally performed, the abutting member 26 actuates the limit switch LS at the rapid feed end position of the wheel support 2, but does not engage with the reference plate member 25, as shown in FIG. 2, since the distance l between the abutting member 26 and the reference plate member at the retracted end position of the wheel support 2 is larger than the rapid feed amount. Thereafter, the wheel support 2 is advanced at the rough grinding feed rate and subsequently at the fine grinding feed rate. When the wheel support 2 is advanced to a position where the sizing device 16 outputs the sizing signal ASFIN, the abutting member 26 is engaged with the reference plate member 25, as shown in FIG. 3. Thereafter, the wheel support 2 is retracted the predetermined amount to its retracted end position, as shown in FIG. 1.

When the wheel support 2 is abnormally advanced at the rapid feed rate even after the actuation of the limit switch LS by the abutting member 26, the flip-flop 15c is set in response to the signal from the comparator 15a to cause the drive circuit 14 to immediately stop the servomotor 6, thereby stopping movement of the wheel support 2. However, if the velocity detector 8 or the circuit 15 fails to normally operate, the wheel support 2 is advanced still at the rapid feed rate. In such a case, when the wheel support 2 is advanced from its rapid feed end position a slight amount corresponding to a grinding feed amount, the abutting member 26 is engaged with the reference plate member 25 to restrict further forward movement of the piston 18. Accordingly, when the wheel support 2 is still advanced with the piston 18 being restricted from forward movement, the cylinder member 17 is advanced together with the wheel support 2, whereby fluid in the right cylinder chamber 17b is addmitted into the left cylinder chamber 17a through the throttle 21 which restrains rapid forward movement of the wheel support 2. As a result, the feed speed of the wheel support 2 is decreased to a speed set by the throttle 21, such as, a fine grinding speed, so that abnormal rapid movement of the wheel support 2 is safely prevented.

When the grinding wheel 3 is dressed a dressing amount d by a dressing operation, the slow feed amount of the wheel support 2 is increased an amount corresponding to the dressing amount d in a first grinding cycle after the dressing operation, so that the advanced end position of the wheel support 2 is advanced, as shown in phantom lines in FIG. 3. In connection with this, relative position between the cylinder member 17 and the piston 18 is also changed by the amount d.

Figure 4:
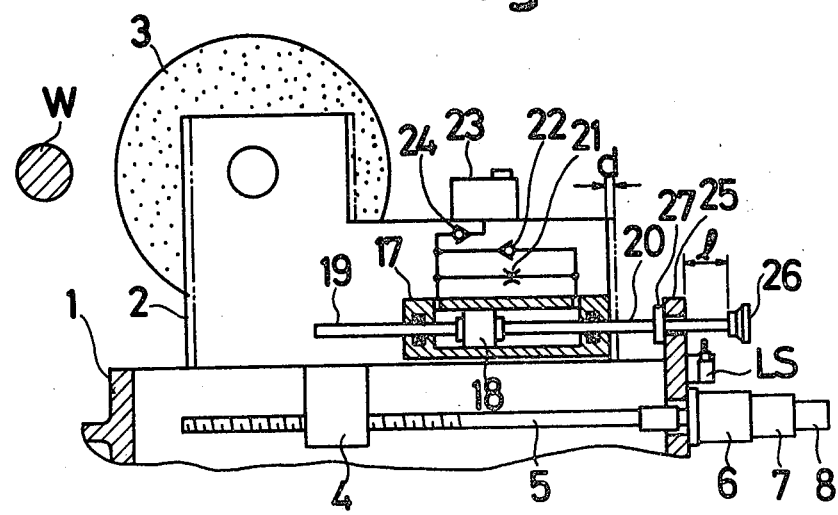

Accordingly, when the wheel support 2 is thereafter retracted the predetermined amount, an retracted end position of the wheel support 2 is advanced by the dressing amount d, as shown in FIG. 4. However, the distance 1 between the abutting member 26 and the reference plate member 25 is not changed, since the rearward movement of the piston 18 is restrained by engagement of its flanged portion 27 with the reference plate member 25. Accordingly, the dressing operation has nothing to do with the prevention of the wheel support from being moved at the overspeed.

Figure 5:
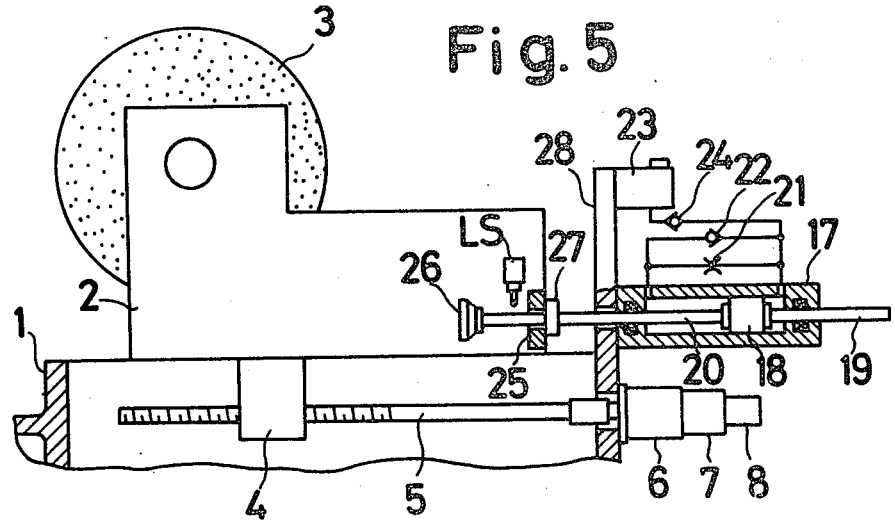
FIG. 5 is a schematic illustration of a second embodiment of a feed safety apparatus according to the present invention.

Referring now to FIG. 5 showing a second embodiment of the present invention, an upstanding support plate 28 is secured to the rear end of the bed 1 in place of the reference plate member 25 in the first embodiment. The cylinder member 17 slidably receiving the piston 18 is secured to the rear side of the support plate 28. The reference plate member 25 and the limit switch LS are fixedly mounted on the rear of the wheel support 2. The piston rod 20 of the piston 18 passes through the support plate 28 and is formed at its intermediate portion with the flanged portion 27 which is engageable with the rear side of the reference plate member 25. The piston rod 20 is also formed at its forward end with the abutting member 26 which is abuttable with the front side of the reference plate member 25. The second embodiment is operated in a similar way to the first embodiment with the same effect.

Figure 6:
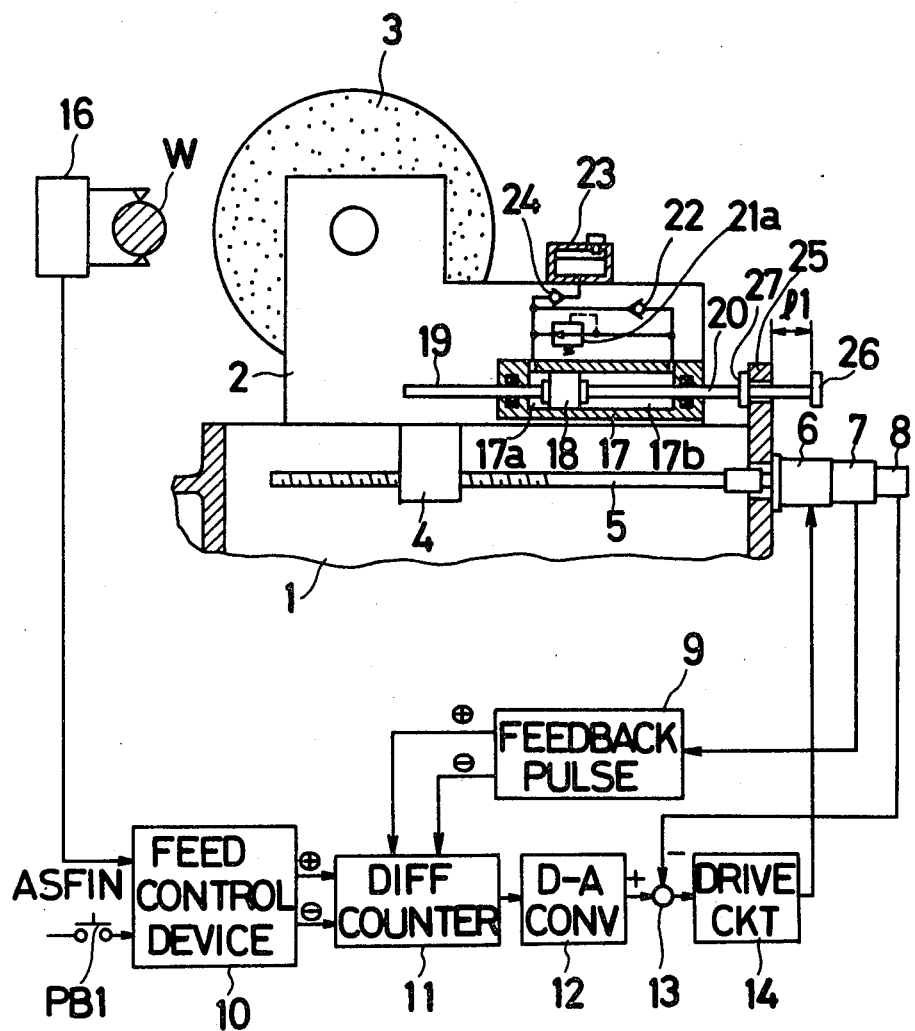
FIG. 6 is a schematic illustration of a third embodiment of a safety apparatus according to the present invention.
Figure 7:
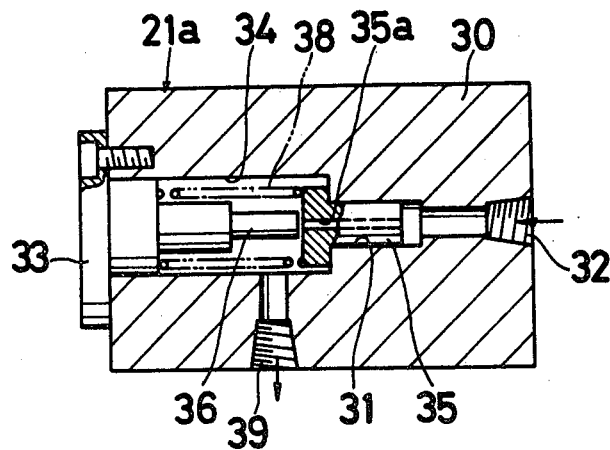
FIG. 7 is a sectional view of a pressure responsive valve illustrated in FIG. 6.

A third embodiment of the present invention is shown in FIG. 6, which is constructed similarly to the first embodiment except the following difference. A distance l1 between the reference plate member 25 and the abutting member 26 with the wheel support 2 being in its retracted end position is set to be smaller a predetermined amount than a rapid feed amount LR of the wheel support 2. The limit switch LS in the first embodiment is omitted in the third embodiment. A pressure responsive valve 21a is provided between the left and right cylinder chambers 17a and 17b in place of the throttle 21 in the first embodiment. As shown in FIG. 7, the pressure responsive valve 21a comprises a valve housing 30 which is formed with a central bore 31 communicating at its one end with an inlet port 32 connected to the right cylinder chamber 17b. The other end of the central bore 31 is enlarged to form a chamber 34 which is covered at its open end by a cover member 33 secured to the valve housing 30. A movable spool 35 is slidably received in the central bore 31 and formed with a through throttle passage 35a along its axis. The cover member 33 is formed with a projection 36 extending toward the movable spool 35 in face to face relationship with the throttle passage 35a of the movable spool 35. A compression spring 38 is interposed between the cover member 33 and an enlarged portion of the movable spool 35 to urge the movable spool 35 away from the projection 36 of the cover member 33. The chamber 34 communicates with an outlet port 39 which is connected to the left cylinder chamber 17a.

Figure 8:
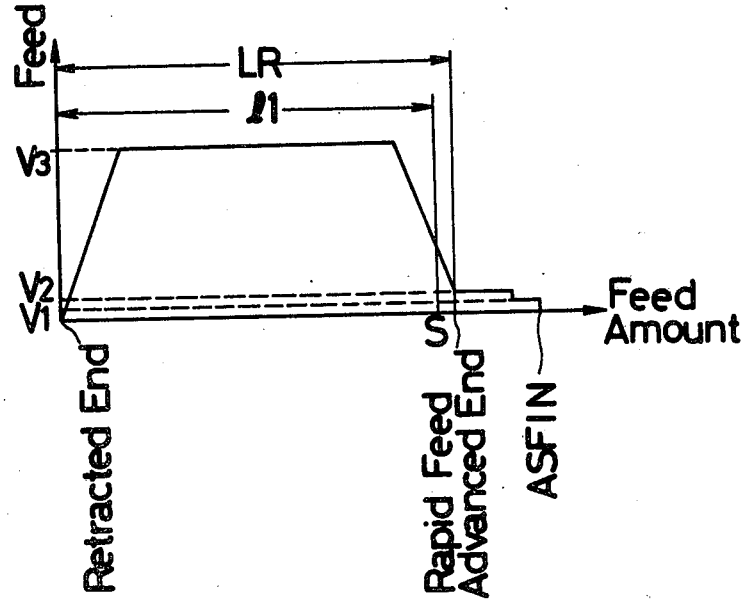
FIG. 8 is a graph showing a change in feed rate of a grinding wheel support illustrated in FIG. 6.

In operation, when the start switch PB1 is depressed, the wheel support 2 is advanced the rapid feed amount LR at a rapid feed rate V3, as shown in FIG. 8. Thereafter, the wheel support 2 is advanced a predetermined amount at a rough grinding feed rate V2 to perform a rough grinding operation on the workpiece W. Upon completion of the rough grinding operation, the wheel support 2 is advanced at a fine grinding feed rate V1 to perform a fine grinding operation. When the workpiece W is ground to a predetermined finish size, the sizing device 16 outputs the sizing signal ASFIN to the feed control device 10 which then causes the wheel support 2 to retract to its retracted end position at the rapid feed rate V3.

Figure 9:
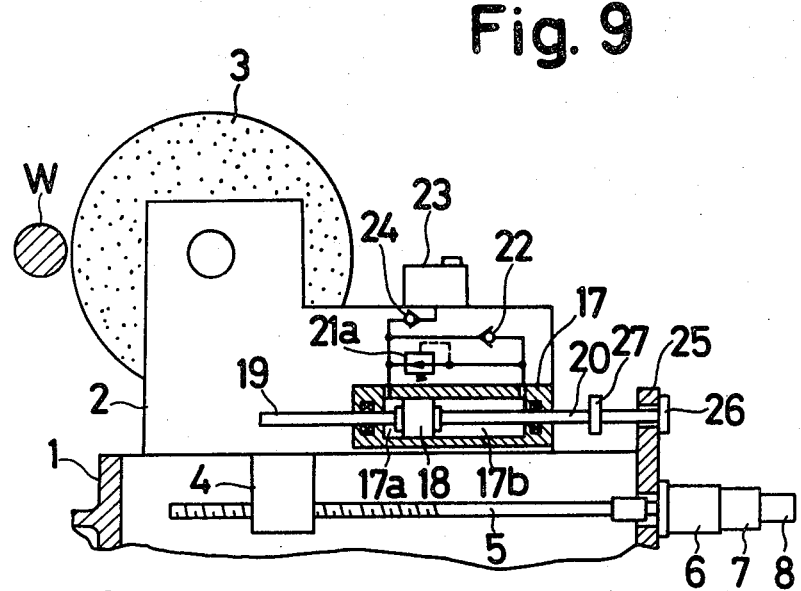
FIGS. 9 and 10 are views similar to FIG. 6 but showing the parts in different relative positions.

During the above described normal grinding cycle, when the wheel support 2 is advanced from its retracted end position shown in FIG. 6 at the rapid feed rate V3, the cylinder member 17 and the piston 18 are moved together with the wheel support 2. Since the distance l1 between the reference plate member 25 and the abutting member 26 is set to be smaller than the rapid feed amount LR, the abutting member 26 is brought into abutting engagement with the reference plate member 25, as shown in FIG. 9, when the wheel support 2 is moved into a position S, a little behind of the rapid advance end position, where the feed rate of the wheel support 2 is being ruduced from the rapid feed rate V3 to the rough grinding feed rate V2, as shown in FIG. 8. Accordingly, the piston 18 is prevented from movement, so that only the cylinder member 17 is moved together with the wheel support 2. Since the feed rate of the wheel support 2 at the position S is close to the rough grinding feed rate V2 in a normal grinding cycle, the relative speed between the cylinder member 17 and the piston 18 is low, so that fluid pressure caused thereby in the right cylinder chamber 17b is less than a value set by the spring 28 of the pressure responsive valve 21a, whereby the throttle passage 35a is kept open. Accordingly, fluid in the right cylinder chamber 17b is admitted into the left cylinder chamber 17a through the inlet port 32, throttle passage 35a, chamber 34 and outlet port 39, to thereby permit forward movement of the cylinder member 17 and the wheel support 2.

Figure 10:
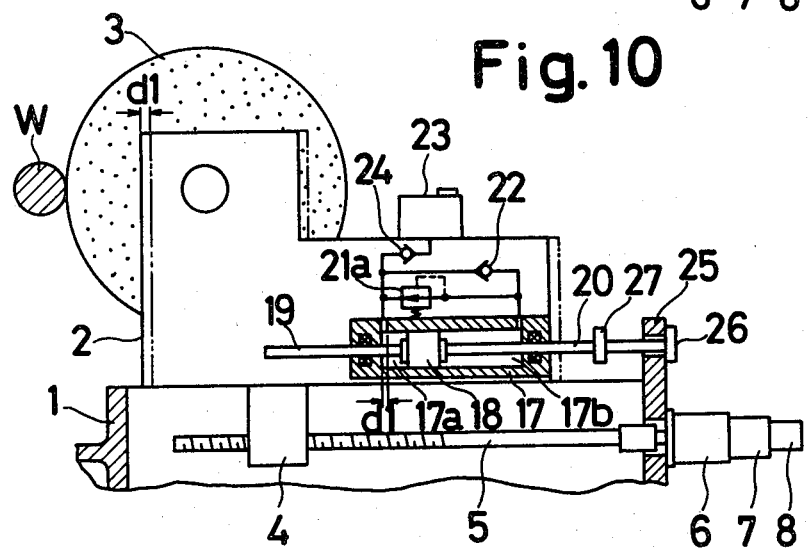

Forward movement of the wheel support 2 is continued until the sizing device 16 generates the sizing signal ASFIN, whereby the wheel support 2 is moved an amount d1 from the position shown in FIG. 9 to the position shown in FIG. 10. The cylinder member 17 is also moved the amount d1 relative to the piston 18. Upon generation of the sizing signal ASFIN, the wheel support 2 is rapidly retracted from the position shown in FIG. 10 to the position shown in FIG. 6. It is to be noted here that the flanged portion 27 is first moved into abutting engagement with the reference plate member 25 when the wheel support 2 is retracted the amount l1 and thereafter the cylinder member 17 is further retracted the amount d1 relative to the piston 18.

If the servomotor 6, resolver 7, or the velocity detector 8 fails to normally operate, the wheel support 2 is abnormally advanced at the rapid feed rate even after the abutting member 26 is engaged with the reference plate member 25. Accordingly, in such a case, fluid pressure in the right cylinder chamber 17b caused by the relative movement between the cylinder member 17 and the piston 18 exceeds the value set by the spring 38, whereby the movable spool 35 is moved to the left, as viewed in FIG. 7, into the abutting engagement with the projection 36 of the cover member 33 to close the throttle passage 35a. Therefore, communication between the right and left cylinder chambers 17b and 17a is shut off to thereby forcibly stop the advance movement of the wheel support 2 before the grinding wheel 3 contacts the workpiece W.

Obviously, numerous modifications and variations of the present invention are possible in light of the above teachings. It is to be understood, therefore, that within the scope of the appended claims, the invention may be practiced otherwise than as specifically described herein.

What is claimed is:

1. A feed safety apparatus for a movable member slidably supported on a stationary bed of a machine tool, comprising:
feed means having a single drive motor for moving said movable member a predetermined first distance at a rapid feed speed and then a second distance at a machining feed speed substantially lower than said rapid feed speed;
a hydraulic cylinder fixedly mounted on one of said bed and said movable member and including a piston slidably received therein to define a pair of cylinder chambers;
fluid flow regulating means disposed between said pair of cylinder chambers for controlling flow of fluid between said pair of cylinder chambers so as to prevent said piston from moving relative to said hydraulic cylinder not sufficiently slower than said rapid feed speed; and
piston control means for permitting bodily movement of said piston with said hydraulic cylinder when said movable member is moved by said feed means said predetermined first distance, but restraining movement of said piston relative to the other of said bed and said movable member when said movable member is subsequently moved by said feed means said second distance, whereby said movable member is prevented from moving said second distance not sufficiently slower than said rapid feed speed.

2. A feed safety apparatus as set forth in claim 1, wherein said fluid flow regulating means comprises a throttle for setting a relative moving speed between said hydraulic cylinder and said piston into a predetermined value lower than the rapid feed speed of said movable member.

3. A feed safety apparatus as set forth in claim 2, further comprising:
a fluid reservoir mounted on one of said bed and said movable member and communicating with one of said pair of cylinder chambers;
a first check valve disposed between said fluid reservoir and said one cylinder chamber for permitting fluid flow from said fluid reservoir to said one cylinder chamber; and
a second check valve disposed between said pair of cylinder chambers in parallel relationship with said throttle for permitting fluid flow from said one cylinder chamber to the other cylinder chamber.

4. A feed safety apparatus as set forth in claim 1, 2 or 3, wherein said hydraulic cylinder further includes a piston rod protruding outwardly thereof from one end of said piston and wherein said piston control means comprises:
a reference plate member secured to said other of said bed and said movable member; and
an abutting member bodily provided on said piston rod and abuttable with said reference plate member for restraining movement of said piston relative to the other of said bed and said movable member after said hydraulic cylinder and said piston are moved bodily with said movable member said predetermined first distance.

5. A feed safety apparatus as set forth in claim 4, wherein said piston control means further comprises a flanged portion formed on said piston rod and abuttable with said reference plate member to maintain a predetermined third distance between said reference plate member and said abutting member when said movable member is at a retracted end position thereof, said predetermined third distance being approximately the same as said predetermined first distance.

6. A feed safety apparatus as set forth in claim 5, wherein said feed means comprises:
a feed screw shaft rotatably supported by said bed;
a nut secured to said movable member and threadedly engaged with said feed screw shaft;
an electric servomotor provided as said single drive motor for rotating said feed screw shaft; and
control circuit means connected to said electric servomotor for applying thereto electric signals to move said movable member said predetermined first distance at said rapid feed speed and then said second distance at said machining feed speed.

* * * * *